United States Patent [19]

Dunkel et al.

[11] 4,228,579

[45] Oct. 21, 1980

[54] METHOD AND APPARATUS FOR WINDING A STRIP OF FILM AND FOR INSERTING IT IN A CASSETTE

[75] Inventors: Franz-Heinz Dunkel, Leverkusen; Ralf L. Klinkhammer, Cologne; Heinz Nebel, Leverkusen; Siegfried Spanner, Langenfeld; Gerd Seibel, Leverkusen, all of Fed. Rep. of Germany

[73] Assignee: AGFA-Gevaert, A.G., Leverkusen, Fed. Rep. of Germany

[21] Appl. No.: 15,800

[22] Filed: Feb. 27, 1979

[30] Foreign Application Priority Data

Mar. 4, 1978 [DE] Fed. Rep. of Germany ....... 2809360

[51] Int. Cl.³ ............................................. B23P 19/00
[52] U.S. Cl. ....................................... 29/430; 29/806; 29/DIG. 44; 242/56 R; 242/68
[58] Field of Search ................. 29/429, 430, 431, 806, 29/DIG. 44; 242/68, 74, 71, 71.1, 56 R

[56] References Cited

U.S. PATENT DOCUMENTS

| | | |
|---|---|---|
| 2,567,387 | 9/1951 | Link .......................................... 242/68 |
| 3,226,816 | 1/1966 | Wilson et al. ........................... 29/430 |
| 3,325,889 | 6/1967 | Meli et al. ............................... 29/430 |
| 3,364,552 | 1/1968 | Napor et al. ......................... 29/806 X |
| 3,457,627 | 7/1969 | Napor et al. ......................... 29/806 X |
| 3,742,586 | 7/1973 | Butler et al. ............................. 29/430 |
| 3,748,715 | 7/1973 | Hoover et al. ...................... 29/806 X |
| 3,787,954 | 1/1974 | Gade et al. .............................. 29/430 |
| 3,856,226 | 12/1974 | Dowd, Jr. ............................ 242/56 R |
| 3,930,296 | 1/1976 | Hoover .................................... 29/430 |
| 4,100,667 | 7/1978 | Napor et al. ......................... 29/430 X |

*Primary Examiner*—Charlie T. Moon
*Attorney, Agent, or Firm*—Connolly and Hutz

[57] ABSTRACT

A method and an apparatus of cutting a strip of film and a protective paper tape to length, winding them and inserting them into a cassette. The strip of film is wound together with the protective paper tape which is offset in the longitudinal direction and cut to length in distribution wheels and after being fed via a guide duct to a spindle is wound and inserted into a cassette housing which is open on one side. The end of the protective paper tape is welded on a spool held by means of vacuum into the cassette housing before closure of the cassette housing with the cover.

7 Claims, 6 Drawing Figures

METHOD AND APPARATUS FOR WINDING A STRIP OF FILM AND FOR INSERTING IT IN A CASSETTE

The invention relates to a method and an apparatus for cutting a strip of film and a light protective paper tape to length, for winding them and inserting them in cassettes, all at high cyclic rate, in which the strip of film and the protective tape which is offset in the longitudinal direction, are cut to length on distribution wheels, are fed via guide means to a spindle and after being wound are inserted into a cassette.

In the past, rolls of films were wound from protective tape and a strip of film on separate winding machines and prevented from springing out by a roll securing device comprising a clamp or an adhesive tape. They were then placed in cassettes in another machine by inserting the rolls into the cassette and simultaneously removing the roll securing device. On a large scale, this mode of operation is very complicated, results in faults and is thus expensive.

A method and an apparatus for loading film cassettes with detachable covers is described in German Offenlegungsschrift No. 2,722,654, in which loading is carried out by a take-up or working head, a rotary support for conveying the working head to a plurality of charging or loading positions, a drive mechanism for the support, a movable cassette holder mounted on the working head, an arrangement for moving the cassette holder from a first position into a second position on the working head, an arrangement for removing and for reapplying the cover from or to a cassette in the cassette holder and for introducing the rolls of film with the cassette holder located at the first position and by an arrangement for welding or sealing the cassette cover to the cassettes with cassette holders located at the second position.

This apparatus and the mode of operation have the disadvantage that the operations of winding and insertion in the cassette take place in succession owing to the timing and only low cyclic rates can thus be achieved. Damage, such as, slipping of the roll and subsequent scratching of the film or interference when inserting it into the cassette, can easily be caused by the intermediate storage of the finished rolls in a roll transfer device. The front end of the protective tape should also be of an exact length and should not be displaced against the roller.

The object of the invention is to produce rolls free from adhesive tape at high speeds with a continuous supply of strip of film and protective tape and to introduce them in a careful manner directly into a cassette which is open at the side, without displacement and deformation, to weld the front end of the roll to the core of the cassette and to place the cover on the cassette.

The object is achieved according to the invention in that a protective paper tape which has been preshaped at the beginning is brought via associated slits which open at the circumference of the spindle, is secured by vacuum and is wound, and a strip of film is inserted in a defined manner in the paper roll wedge being formed and is entrained, wherein the protective tape and the strip of film are then wound on the spindle under the tension of the spring of an annular spring coupling and once the strip of film and the protective tape have been cut through, the winding process is ended at a higher speed by releasing the spring and the paper tape is grasped at the end before the arrival of the continuously conveyed strip of paper and film, and the rolls of film are released from the winding pin by compressed air introduced into the spindle and are pushed by a pusher plate at the same time as the grasped end of the protective tape into a cassette which has been brought with predetermined timing next to the winding apparatus.

The considerable advantages of the apparatus according to the invention and of the method lie, in the rapid, precise gripping of the preshaped beginning of the protective tape by two vacuum slits in the spindle, and in the careful winding by means of an annular spring coupling which, surprisingly, also allows a time reserve to be created for the transfer of the roll with its protective paper end into the cassette by extremely simple means and therefore to permit the continuous careful feeding of strip of film and protective tape. The desired rapid and precise transfer of the roll into the cassette is achieved by the controlled holding of the spindle by means of an electromechanical brake, the controlled, somewhat later gripping of the end of the protective tape and the blowing of compressed air in between the roll and the spindle.

In a particular embodiment for carrying out the method, the beginning of the protective tape is adapted to the shape of the spindle by stamping it at a previous position so that the sucking in of the beginning of the protective tape by the vacuum at the spindle is considerably assisted and accelerated.

Another embodiment improves the reliability of suction by arranging in the spindle two holes which are widened to slits which almost correspond in width to that of the beginning of the protective tape.

Particularly rapid and mechanically simple handling of the cassette is achieved during loading because the complete cassette is fed to the winding unit, the core located in it is held during the feeding operation by the application of a vacuum and the cover is pivoted 90° away from the housing and after introducing the roll and welding the tongue of the roll on to the take-up core, the cover is pivoted back by 90° in a mechanically simple manner and is placed on the housing.

This design is simple in structure and while operating at high speed demands only low costs for servicing and repairs. Rejects are avoided and valuable material is saved by the precise careful mode of operation. The apparatus functions completely automatically and substantially without breakdowns using the conventional known control elements.

An embodiment of the invention is shown in the drawings and is described in more detail below.

Figure 1:
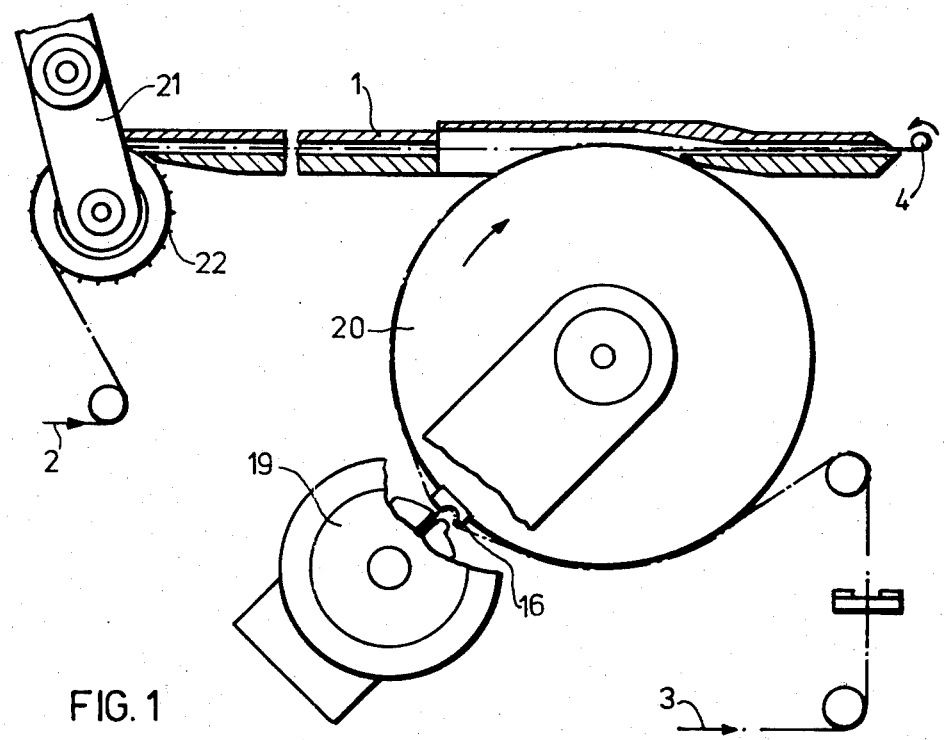
FIG. 1 shows the cutting to length of the tapes and their supply to the spindle.

A strip of film (FIGS. 1 and 2) is drawn, in known manner, from a supply roll via loop stores to avoid stoppages, when it is necessary to exchange the supply roll, and is guided on to a distribution wheel 22. The distribution wheel can be provided with perforating teeth if a perforated film is used. The distribution wheel 22 pushes the strip of film through a feed duct 1 to a spindle 4 and the strip of film is cut to length by a cutting arrangement 21 after one rotation of the distribution wheel. At the same time, a protective paper tape 3, also fed from supply rolls via loop stores and control arrangements of a conventional type such as, for example, photocells for maintaining and controlling the relative position of the strip of film 2 and protective paper tape 3 in the longitudinal direction, to a distribution wheel 20, is grasped to a desired displacement in the longitudinal direction and pushed into the feed duct 1 below the strip of film 2. The conveying of the protective paper tape is controlled with respect to speed, in dependence on the transport of the strip of film and is cut to length by a cutting arrangement 19. An additional arrangement on the cutting arrangement 19 allows the beginning of the next tape to be provided with a strain deformation 16 in such a manner that it can be grasped better by the spindle 4.

Figure 2:
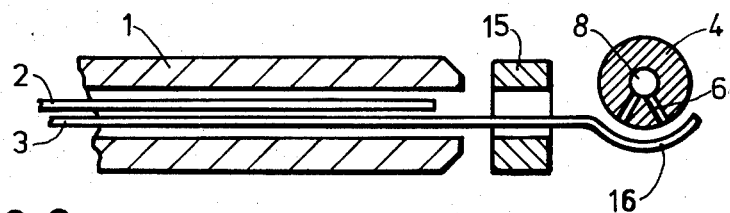
FIG. 2 shows a vertical section through supply means and spindle.
Figure 3:
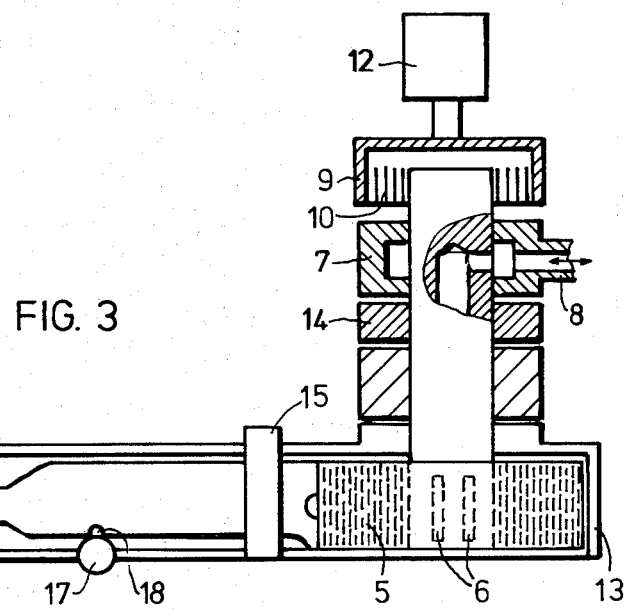
FIG. 3 shows the horizontal section through a spindle.

FIG. 2 shows an enlarged view of the feed duct 1 in which the protective tape 3 and the strip of film 2 are pushed in as described. In this Figure the protective tape 3 with its deformation 16 is advanced and reaches the spindle 4 first. The spindle which is hollow can be switched over to compressed air or a vacuum as shown in FIG. 3, by means of a fixed annular supply means 7. If a vacuum is applied, the spindle 4 sucks the protective tape 3 over one, two or more slits 6 and begins to wind it. After a predetermined time, the strip of film 2 reaches the wedge formed by the resulting roll, is grasped and wound concurrently. The spindle drive mechanism 12 rotates constantly but faster than that of the tape release of the distribution wheels 22 for the strip of film and 20 for the protective tape, even though the winding speed of the roll decelerates as the diameter of the roll increases and the speed of the driving wheels remains constant. A spring 10 is thus stretched in an annular spring coupling 9.

Figure 5:
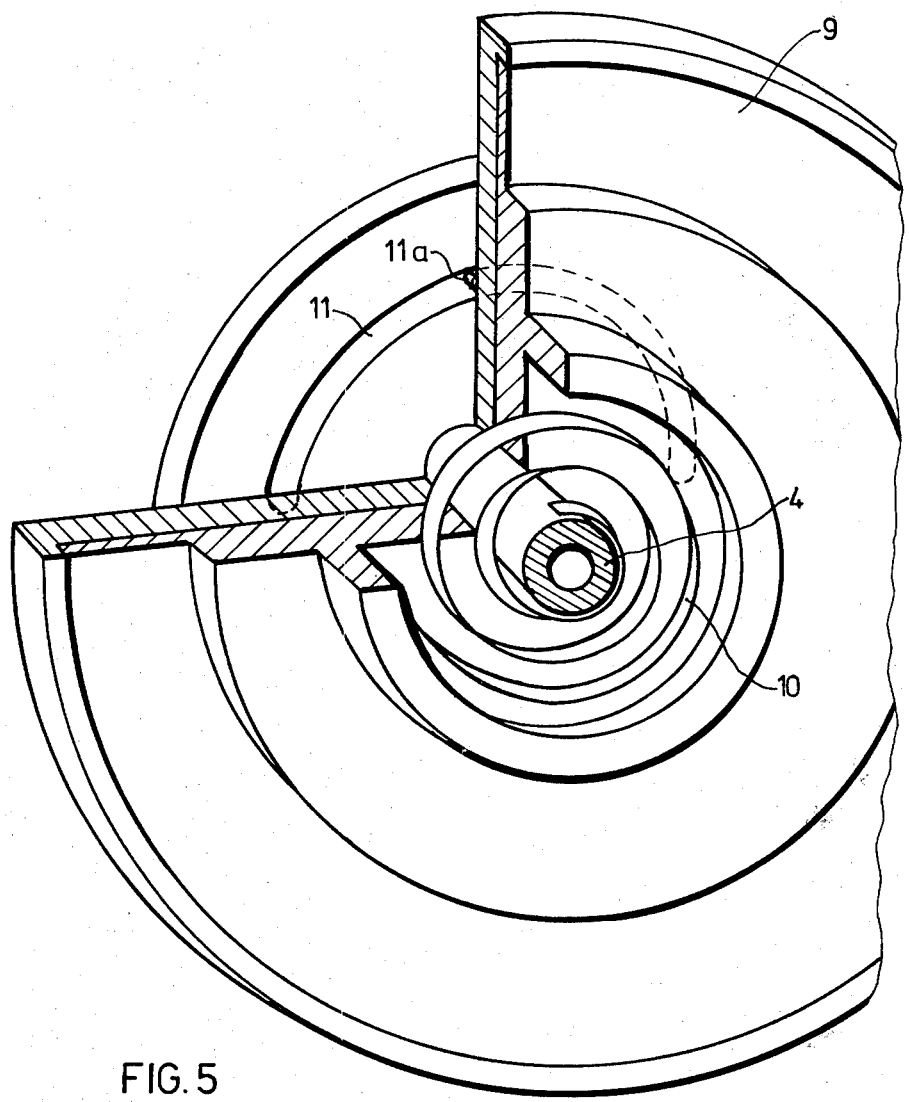
FIG. 5 shows the annular spring coupling.

FIG. 5 shows an annular spring coupling 9 of this type. The drive mechanism acts on the coupling disc and via the spring 10 on the spindle 4. If the drive mechanism rotates faster than the spindle which is braked by the protective tape 3, then the spring 10 is stretched. Once the protective tape 3 and the strip of film 2 have been cut to length, the energy stored in the spring is released and is converted into an acceleration of the winding process. An arcuate slot 11 in which slides a bolt 11a limits the twisting of the spindle relative to the drive mechanism and ensures that the spindle 4 is always in the same position at the beginning of winding by means of the spring 10.

The spring 10 is advantageously designed as long as possible so that no substantial increase in force is generated in the desired range of 4 to 8 stored rotations of the spindle 4 and so that tearing of the protective tape 3 is avoided.

As already mentioned, once the strip of film 2 and protective tape 3 have been cut to length on the distribution wheels, the spring 10 can release the annular spring coupling 9 and thus use the stored energy to accelerate the winding process. A time interval is thus produced between the end of the winding process and the arrival of new tapes for the next roll. This period is utilised, according to the invention, for clearing the winding unit in FIG. 3, for the next operation.

Figure 4:
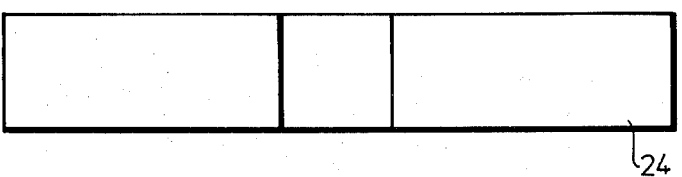
FIG. 4 shows a perspective illustration of the transfer of the rollers into the cassette.
Figure 4:
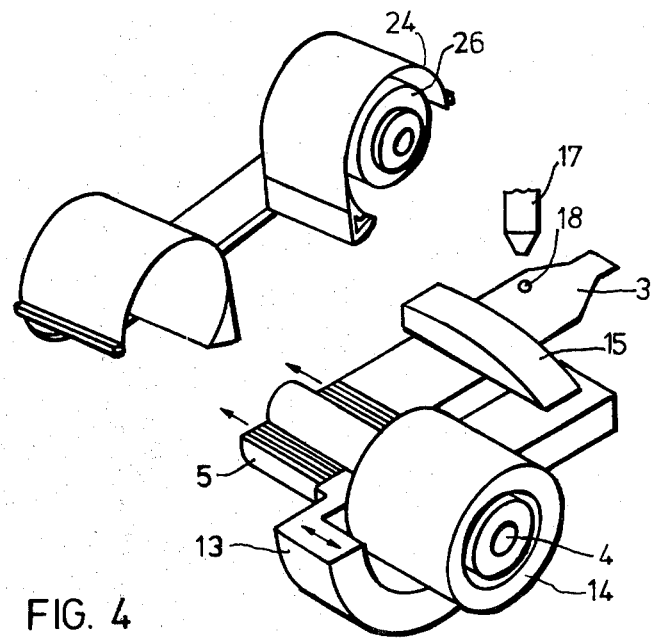

Shortly before the end of the winding process, a marking 18 on the strip of film, shown in FIGS. 3 and 4 or on the protective tape switches on, via a photocell 17 or by other monitoring devices of a known type, firstly a brake 14 for the spindle 4, for example, a mechanically electromagnetic brake, which brakes the spindle 4 and then, after a slight delay, causes a clamp 15 to grip the end of the protective tape 3. This arrangement is designed so as to allow the roll 4 and the end of the protective tape 3 to be gripped precisely in the manner in which they then have to be inserted into the cassette housing 24.

Upon completion of the winding process, (FIG. 3) the vacuum is disconnected and compressed air is blown into the spindle 4 via a line 8 and the supply means 7. Roll 5 is thus detached from the spindle 4. A pusher plate shown in FIG. 4, 13, to which the clamp 15 is fixed, moves from the winding unit toward the cassette housing 24, pushes the roll with the end of the protective tape 3, into the prevailing take-up of the cassette housing 24 which is open to the side and then releases the roll 5. The roll unfurls and rests against the walls of the cassettes housing 24. The clamp then opens and releases the protective tape. The pusher unit returns to the starting position so that the winding unit can complete the next roll while the filled cassette can be transported via a transport chain, turntable or the like and can thus be replaced by an empty cassette housing for the next roll.

Figure 6:
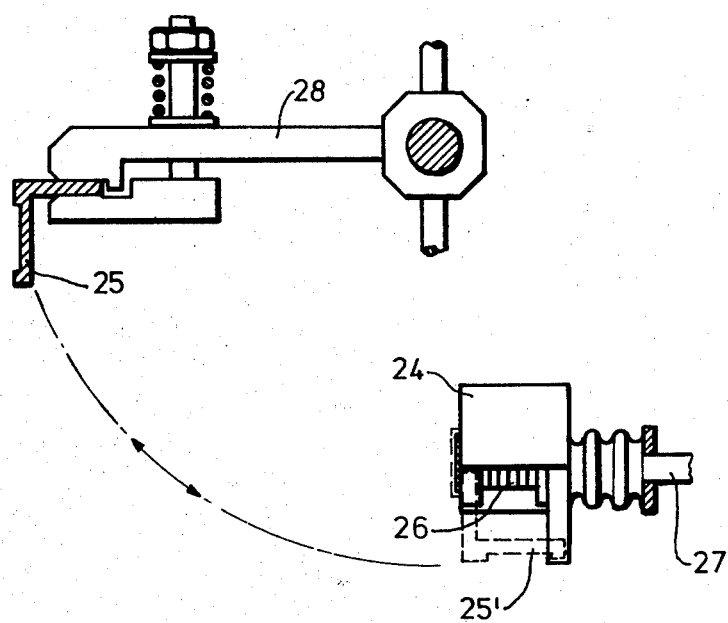
FIG. 6 shows the unit for removing and replacing the cassette cover.

During the supply of the cassette 23, (FIG. 6) which comprises a housing 24, a cover 25 and a core 26, the core 26 is held by a vacuum 27 which acts on the spool 26, through a small opening in the housing and the cover 25 is simultaneously pivoted upwards by 90° in a simple mechanical movement by means of a gripper 28 which is driven via a cam control (not shown). After loading the cassette with the roll 5 and the front tongue protective paper tape 3, as mentioned above, the latter is welded to the core 26, and the cover 25 is then placed on the housing 24 again in a return pivot of the gripper 28. The loaded cassette 23 can then be sealed by adhesion or welding by ultrasonic methods and packaged.

The individual processes described take place at considerable speed, the sensitive strip of film 2 and the protective tape 3 being conveyed continuously to the winding unit. Rapid and careful introduction of the roll into the cassette housing which is opened at the side is possible without deformation or displacement as a result of the direct transfer of roll 5 and of the end of the protective tape 3 in a form fixed at the end of the roll by means of pusher plate 13 and clamp 15 into the cassette, with release by compressed air of the connection between spindle 4 and roll 5.

We claim:

1. A method of cutting a strip of film and a light protective paper tape to length, winding them and inserting them into a cassette, in which the strip of film together with the protective tape which is offset in the longitudinal direction, is cut to length on distribution wheels, and after being fed via a guide means to a spindle, is wound and inserted into a cassette which is open at the side, characterised in that the protective paper tape (3) which is preshaped at the beginning, is brought over associated slits (6) opening on the circumference of the spindle, is held by a vacuum and is wound, and in that the strip of film (2) is pushed in a defined manner into the roller wedge being formed and is entrained, wherein the protective tape (3) and the strip of film (2) are then wound on the spindle (4) under the tension of a spring (10) of an annular spring coupling (9) and once the strip of film (2) and the protective tape (3) have been cut through, the winding process is ended at a higher speed by releasing the spring (10) and, before the arrival of the continuously conveyed strip of paper and film, the paper tape (3) is grasped at the end and the roll (5) is released from the winding spindle by compressed air introduced into the spindle (4) and is pushed by a pusher plate (13) into a cassette housing (24) which is open at the side and is brought with predetermined timing next to the winding apparatus, at the same time as the gripped end of the protective tape (3).

2. An apparatus for cutting a strip of film and a light protective paper tape to length, winding them and inserting them into a cassette, in which the strip of film together with the protective tape which is offset in the longitudinal direction, is cut to length on distribution wheels, and after being fed via a guide means to a spindle, is wound and inserted into a cassette which is open at the side comprising distribution wheels for the strip of film and the protective paper tape, a spindle, a feed duct for conducting a strip of film and protective paper tape to the spindle, the feed duct is arranged downstream of the spindle, slits on the spindle which can be connected selectively to a vacuum line or compressed air line, the spindle is connected via an annular spring coupling to a spindle drive mechanism, the spindle is provided with a brake, a pusher plate is provided adjacent the spindle, and the pusher plate having a clamp for gripping the end of the protective paper tape.

3. An apparatus according to claim 2, characterised in that a beginning end of the protective tape is deformed by a strain deformation (16) which is adapted to the shape of the circumference of the spindle (4).

4. An apparatus according to claim 2, characterised in that two or more holes (6) widened to form slits are arranged in succession on the circumference of the spindle (4) and correspond in width to that of the protective tape.

5. An apparatus according to claim 2, comprising means for supplying a cassette casing adjacent the spindle, the cassette casing having a core disposed therein, vacuum means for holding the core within the cassette casing, the cassette casing having a cover, a cover removing linkage disposed adjacent the spindle for removing the cover and replacing it after insertion of the wound strip of film and protective paper tape, means for attaching the end of the protective paper tape extending from the wound strip of film to the core, and means for sealing the cover on the cassette after the wound strip of film and paper tape are inserted therein and the cover replaced by the linkage.

6. A method of winding a strip of film and a light protective paper tape together and inserting them in a cassette, which is open on one side comprising the steps of conducting aligned strip of film and paper tape to a winding spindle, preshaping a leading end of the paper tape to the circumference of the spindle, holding the preshaped end of the paper tape on the spindle by a vacuum while the end is commenced to be wound on the spindle, inserting a leading end of the strip of film into the paper tape as it is being wound, driving the spindle through a spring clutch to store energy therein and tension the strip of film and paper tape as they are being wound, whereby the winding is maintained tightly wound together for a predetermined time, cutting the strips of film and of light-protective paper tape, clamping trailing ends of the strip of film and paper tape on a transfer plate for carrying the wound strip of film and paper tape to a cassette open on a side, transferring the winding from the spindle into the cassette on the transfer plate, attaching the trailing end of the winding to a core in the cassette, releasing the clamping means and removing the transfer plate and sealing the cassette.

7. A method as set forth in claim 1, wherein a leading end of the paper tape is shaped to fit the outside of the spindle before it is moved into contact therewith.

* * * * *